US011014746B2

(12) United States Patent
Fellner et al.

(10) Patent No.: US 11,014,746 B2
(45) Date of Patent: May 25, 2021

(54) METHOD FOR PICKING MIXED PRODUCTS ON A TARGET PALLET

(71) Applicants: Herbert Fellner, Kolbermoor (DE); Ludwig Brandmüller, Rosenheim (DE)

(72) Inventors: Herbert Fellner, Kolbermoor (DE); Ludwig Brandmüller, Rosenheim (DE)

(*) Notice: Subject to any disclaimer, the term of this patent is extended or adjusted under 35 U.S.C. 154(b) by 172 days.

(21) Appl. No.: 16/322,589

(22) PCT Filed: Aug. 9, 2017

(86) PCT No.: PCT/EP2017/070236
§ 371 (c)(1),
(2) Date: May 24, 2019

(87) PCT Pub. No.: WO2018/029271
PCT Pub. Date: Feb. 15, 2018

(65) Prior Publication Data
US 2019/0283965 A1  Sep. 19, 2019

(30) Foreign Application Priority Data

Aug. 9, 2016  (DE) ..................... 10 2016 114 730.3
Aug. 23, 2016  (DE) ..................... 10 2016 115 656.6

(51) Int. Cl.
*B65G 1/137* (2006.01)
*B65G 57/30* (2006.01)
(Continued)

(52) U.S. Cl.
CPC ......... *B65G 1/1378* (2013.01); *B65G 1/1373* (2013.01); *B65G 47/905* (2013.01);
(Continued)

(58) Field of Classification Search
CPC combination set(s) only.
See application file for complete search history.

(56) References Cited

U.S. PATENT DOCUMENTS 4,927,318 A  5/1990  Hayden
5,372,472 A  12/1994  Winski et al.
(Continued)

FOREIGN PATENT DOCUMENTS

DE  38 14 101 A1  11/1988
DE  102013003768  8/2014
(Continued)

OTHER PUBLICATIONS

International Preliminary Report on Patentability dated Feb. 12, 2019 in PCT/EP2017/070230.
(Continued)

*Primary Examiner* — Kyle O Logan
(74) *Attorney, Agent, or Firm* — Boyle Fredrickson S.C.

(57) ABSTRACT

Method for controlling picking of mixed products on a target pallet comprising the steps: —Generation of a packing pattern by means of a packing pattern generator in dependence on the picking commission, —providing the products on infeed conveyors, —taking the products from the infeed conveyors by means of a grab head or the like in a predetermined sequence according to the packing pattern, —placing the respective products in several product towers on a loading plate, wherein the towers are built approximately parallel to each other and are spaced from each other, wherein the area occupied by the towers on the loading plate is larger than the loading surface of a target pallet, —pushing the towers together to the dimensions of the target pallet, —transferring the pushed together product towers to the target pallet and —discharging the picking pallet thus created.

15 Claims, 3 Drawing Sheets

(51) Int. Cl.
*B65G 47/90* (2006.01)
*B65G 57/00* (2006.01)
*B65G 61/00* (2006.01)

(52) U.S. Cl.
CPC ........... *B65G 57/00* (2013.01); *B65G 57/302* (2013.01); *B65G 61/00* (2013.01); *B65G 2201/0267* (2013.01)

(56) References Cited

U.S. PATENT DOCUMENTS

| | | | |
|---|---|---|---|
| 5,738,484 A | 4/1998 | Taylor | |
| 6,055,462 A | 4/2000 | Sato | |
| 6,120,241 A | 9/2000 | Huang et al. | |
| 7,061,508 B1* | 6/2006 | Noguchi | B65G 61/00 345/619 |
| 7,938,614 B2 | 5/2011 | Fritzsche | |
| 8,074,431 B1* | 12/2011 | Pierson | B65G 47/086 53/529 |
| 8,096,404 B2 | 1/2012 | Eschlbeck et al. | |
| 2005/0265816 A1 | 12/2005 | Blanc | |
| 2006/0106487 A1* | 5/2006 | Allen | B65G 61/00 700/213 |
| 2006/0257236 A1* | 11/2006 | Stingel, III | B65G 1/1378 414/791.6 |
| 2007/0280814 A1 | 12/2007 | Morency et al. | |
| 2008/0257684 A1 | 10/2008 | Weller | |
| 2008/0267759 A1 | 10/2008 | Morency et al. | |
| 2010/0146907 A1 | 6/2010 | Fritzsche et al. | |
| 2010/0268675 A1 | 10/2010 | Baldes et al. | |
| 2010/0324729 A1 | 12/2010 | Ruge | |
| 2011/0130868 A1* | 6/2011 | Baumann | B65G 1/1378 700/217 |
| 2015/0073588 A1* | 3/2015 | Priebe | B65G 57/00 700/217 |
| 2017/0146341 A1 | 5/2017 | Kimoto et al. | |
| 2018/0229948 A1 | 8/2018 | Kollmuss et al. | |
| 2019/0263591 A1 | 8/2019 | Fellner | |

FOREIGN PATENT DOCUMENTS

| | | |
|---|---|---|
| EP | 0 511 529 A1 | 11/1992 |
| EP | 2 072 430 A1 | 6/2009 |
| EP | 2 226 273 A2 | 9/2010 |
| EP | 2 330 060 A1 | 6/2011 |
| EP | 2 769 341 A2 | 8/2014 |
| EP | 2796341 | 10/2014 |
| EP | 2 794 439 | 4/2016 |
| JP | 2011251837 | 12/2011 |
| WO | 2011054053 A1 | 5/2011 |
| WO | 2012019591 | 2/2012 |
| WO | 2014041318 | 3/2014 |

OTHER PUBLICATIONS

International Preliminary Report on Patentability dated Feb. 21, 2019 in PCT/EP2017/070236.

\* cited by examiner

METHOD FOR PICKING MIXED PRODUCTS ON A TARGET PALLET

BACKGROUND OF THE INVENTION

Field of the Invention

The invention relates to a method for controlling (order) picking of mixed products on a target pallet.

Such a picking method controls a packing robot or a loading system according to a predefined planning algorithm depending on parameters given by a goods management system (WMS) in order to build up a picking pallet (target pallet loaded with mixed products).

Description of Related Art

In the distribution centers of commercial chains, various range items are put together on picking pallets for delivery to the branches. This is often done by human packing work. Due to changes in various framework conditions (labor law regulations, demographic change, requirements concerning packing quality, cost pressure, etc.), the picking process is to be automated.

The experience of the pickers plays a significant role in this manual picking process, since the individual products on the target pallet have to be positioned in such a way that the product stack is relatively stable on the one hand and the products are not damaged on the other hand. For example, when picking fruit, vegetables or the like, the trays used have stacking lugs that engage with corresponding recesses of the tray above or below the product stack to position them relative to each other. At present, these trays are stacked exclusively by hand.

A further problem with picking is that the products on the target pallet have to be positioned in a certain order so that, for example, the products can be placed on the shelves in a retail shop without having to drive back and forth. For this reason, discounters usually place their products within their salesrooms in a certain order that is also familiar to the customers, so that they can quickly find the respective product. Accordingly, the packages/products have to be positioned on the target pallet depending on this placement in the salesroom.

So far, this complex task can only be solved by an experienced picker. Machine solutions, as described in the following, are not suitable for this.

U.S. Pat. No. 8,074,431 B1 shows a loading system in which the products are fed via an infeed conveyor and are then deposited on a grid by means of a grab head. The products are arranged layer by layer on the grid and then transferred to a target pallet after the level/layer has been built up. In principle, such a solution also makes it possible to form a multi-layer product stack on the grid, which is then transferred in its entirety to the target pallet.

In the case where products with different dimensions and thus also with different stacking lug positions are present, such an automated solution cannot be used, since the layer-by-layer structure in the aforementioned order excludes a relative positioning of the stacking lugs to the stacking recesses for different product types.

US 2010/0146907 A1 discloses a loading system in which a separable loading plate is used instead of a grid, on which the products are placed layer by layer or level by level and then transferred to a target pallet. This loading system has the same disadvantages as the solution described above.

In JP 2011 251 837 A, a loading system with a fork head is shown—such a fork head is not suitable for picking tasks of the aforementioned kind.

In U.S. Pat. No. 2,008,267 759, a loading system is shown in which the products are stored level by level directly on a target pallet.

DE 10 2013 003 768 E1 shows a loading system with a fork head that can be equipped with a knife edge. Such a fork head—as described above for JP 2011 251 837 A—is not suitable to fulfill the picking tasks described at the beginning, but is preferably used for dry goods.

WO 2012/019 591 A2 shows a loading system in which a grab head gripping the periphery of a trading unit/product interacts with a stacking device which has an inclined base surface and a centering bar for stacking the picking goods.

Such a solution also does not allow more complex picking tasks to be performed.

In principle, the loading of the pallet can be carried out in a layer-oriented manner, whereby the product stack is then built up layer by layer. Alternatively, a height-oriented setup can also be carried out in which several product stacks/towers are built up in parallel on a target pallet using a packing robot. Such solutions are disclosed, for example, in publications EP 2 769 341 A2, WO 2014/041 318 A1, US 2017/0 146 341 A1, U.S. Pat. No. 6,120,241 B1, US 2010/0 324 729 A1 and US 2010/0 268 675 A1. With all these solutions, however, the product stacks are built directly onto the target pallet by the loading robot—such a procedure is only suitable for products with a predetermined geometry and correspondingly adapted grab heads of the loading robot. For more complex picking tasks, manual picking or correction is additionally required.

SUMMARY OF THE INVENTION

In contrast, the invention is based on the object of creating a method to control picking of mixed products on a target pallet, with which the picking process is simplified.

This object is solved by a method with the features of the claims.

Advantageous further developments are the subject matter of the dependent claims.

The method according to the invention uses a planning algorithm to build a picking pallet, whereby first a packing pattern is generated by means of a packing pattern generator depending on the picking commission. The products to be picked are provided on several infeed conveyors and are taken from the infeed conveyors via a grab head or another handling device (loading robot) according to the sequence predetermined by the packing pattern generator.

The products taken in each case are then placed in several product stacks on a loading plate. These product towers are built in parallel, so that they "grow" in parallel, so to speak. The product towers are spaced from each other so that the grab head can dive into the gaps between the product towers, thus simplifying the stacking and centering of the product stack with regard to a product to be placed on it. Accordingly, the base surface of the loading plate has to be larger than the loading surface of the target pallet.

Once the product towers have been built, they are pushed together to the dimensions of the target pallet and then transferred to the target pallet. The resulting picking pallet is then discharged in a suitable manner.

When generating the packing pattern, the type of product, for example its bottom and edge structures and the type and properties of the goods stored in the trays or the like, are taken into account, so that the position of the respective product in a product tower is determined via the packing pattern generator according to the specifications.

In a particularly preferred embodiment, the packing pattern of the picking pallet generated by the packing pattern generator is visualized on a display. Parallel or additionally, the actual structure of the picking pallet can be shown on the display. This visualization allows a picker to monitor the picking process and to intervene manually if necessary.

In one embodiment it is provided that the picker can change the structure of the picking pallet manually via the display or via another input device. This manual input is then saved with the present picking task and is included in the calculation of the packing pattern for similar picking commissions. In this way, a self-learning system is created in which the picker's experience is taken into account when generating the packing pattern.

The picking process is further simplified if smaller packages are placed on an intermediate space/buffer space and are pushed together to dimensions equal to those of the larger products, such as those already arranged in a product stack, for example. The pushed together packages are then moved from the buffer space to an already partially assembled product tower or to the loading plate.

It can be advantageous if four product towers are built on the loading plate and each of the smaller packages has about half or a quarter of the area of the products, so that correspondingly two or four packages per layer are placed on the buffer space.

The stability of the picking pallet is optimized if heavy products are arranged at the bottom of the tower structure.

As explained at the beginning, the bottom and edge structure of the respective product, for example of a tray, is also included in the calculation of the packing pattern. For example, centering lugs are provided for fruit and vegetable trays, which are immersed in the corresponding centering recesses of the adjacent tray in order to position the two trays relative to each other. These centering means are different for different products—this is taken into account in the packing pattern generator, so that—if the product sequence permits it—similar products with such centering means are preferably arranged in one or more product towers. Until now, such trays had to be stacked by hand.

In one embodiment it is provided that the picking pallet is equipped with a transport safety device after the discharge.

The picking process can be carried out very quickly if at least two grab heads are available to build the product towers.

When creating the packing pattern, the following parameters are preferably taken into account: the pallet height should not exceed 2 m, the maximum pallet weight is, for example, 1200 kg, the packing pattern is optimized with regard to the maximum stability of the tower structure (flat upper end of the picking pallet, no hollow spaces, engageability of the trays/packages, symmetrical weight distribution, etc.).

Furthermore, it is preferred not to distribute the same articles to several picking pallets and to group article groups together. It is especially preferred if the same articles are combined in one or more towers.

Picking safety is further improved if the packing pattern generator generates at least one alternative structure variation, so that an alternative structure variation can be selected automatically or manually if required, for example in the event of a malfunction.

When generating several structure variations, a prioritization can also be performed automatically or by the picker.

As mentioned above, special attention is paid during picking to ensure that the product tower that has already been built is centered with regard to the product to be placed, so that exact placement is guaranteed.

BRIEF DESCRIPTION OF THE DRAWINGS

Preferred embodiments of the invention are explained in more detail below using schematic drawings. They show.

DETAILED DESCRIPTION OF THE PREFERRED EMBODIMENTS

Figure 1:
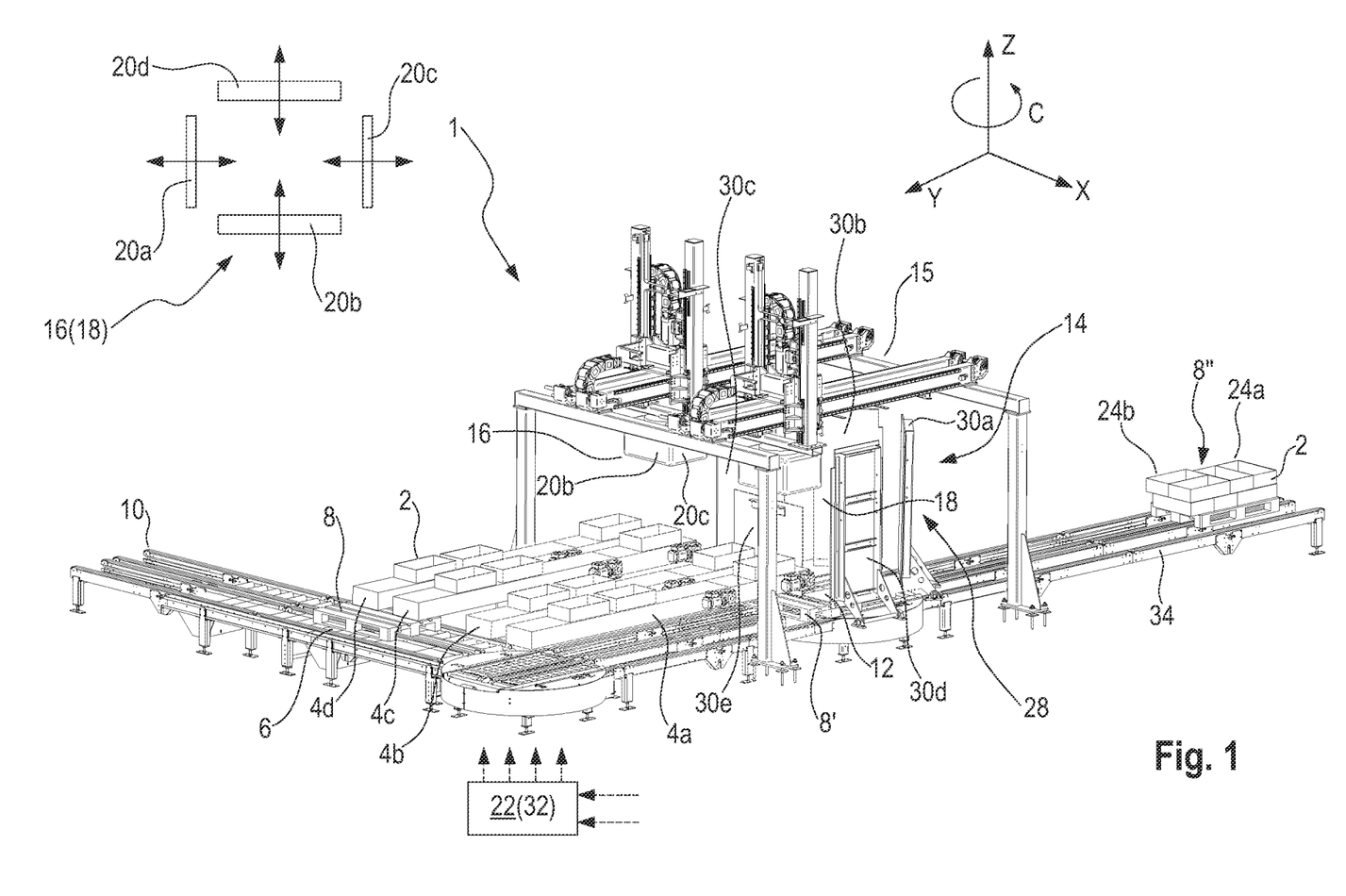
FIG. 1 shows a three-dimensional illustration of an embodiment of a loading system, which is operated using the method according to the invention.

According to FIG. 1, the products to be picked 2 (packages), e.g. fruit and vegetable crates, by means of a loading system 1 are provided from the intermediate storage described at the beginning to four infeed conveyors or belts 4a, 4b, 4c and 4d. In a level below the infeed conveyors 4, a pallet conveyor belt 6 is provided over which a target pallet 8, which is separated from a pallet magazine 10, is brought via a 90° deflection into a loading position, which is marked with the reference sign 8' in the representation according to FIG. 1. Instead of with a pallet conveyor belt, supplying can also be performed via a movable telescopic fork.

In the loading position, the target pallet 8' is located below a separable loading plate 12. The base surface, i.e. the area of the loading plate 12 to be loaded, is significantly larger than the base surface of the pallet 8'. This loading plate 12 is—as will be explained in more detail below—slidable or separable in the horizontal direction within a picking unit 14. This unit has a gantry 15 on which two grab heads 16, 18 are arranged via an X, Y and/or Z guide which can be adjusted via linear drives. The grab heads 16, 18 can also be swiveled over a rotation axis C (see FIG. 1) to align them with the product 2.

Since two grab heads 16, 18 are used in parallel, they can reach the complete pallet construction space as well as all receiving positions of the infeed conveyors 4 independently of each other. In the case of construction space overlapping, one grab head 16, 18 is moved to the respective waiting position, so that the other grab head 16, 18 can reach the target position on the loading plate 12. In case of an error, at least one grab head 16, 18 with the assigned grab head gantry can continue palletizing at half the performance.

Due to the total of eight package-receiving positions distributed over four parallel infeed conveyors 4 as well as the optional buffer positions (not shown) next to the gantry 15 with the two grab gantries and a commission pallet height of 2000 mm, for example, the loading system can be designed to be very compact with a high picking performance. The buffer positions can be accessed at ground level and without additional centering aids. These buffer positions are used to support the sequence-appropriate provision of packages for the construction of the commission pallet. As explained at the beginning, smaller packages, such as those with half or a quarter of the base surface of the products/packages described above, are first positioned at a distance from each other and then pushed together using the grab head 16, 18, so that they have the area of a larger product in this pushed together arrangement. This pushed together layer of the smaller packages is then placed on the already built product stack using the grab head, so that correspondingly two or four smaller packages are placed on a larger product/tray.

In particular with fruit or vegetable trays, it is advantageous if the grabber 16, 18 also has a retainer plate that holds down the vegetable/fruit during the stacking process.

The grab gantries described above are provided with belt-driven linear axes so that a very good repeat accuracy in the range of +/−2 mm is guaranteed.

As indicated in FIG. 1 at the top left, in the shown embodiment each grab head 16, 18 has respectively four grabber plates 20a, 20b, 20c, 20d, which are arranged at right angles to each other and thus form a rectangle (at least in sections) in the plan view. Depending on the geometry of the products 2, the grabber plates 20 are slidable towards or away from each other in the direction of the arrow (see FIG. 1, top left) in order to be brought into lateral contact with the outer wall of product 2, for example a fruit/vegetable crate. This displacement movement takes place in such a way that a sufficient holding force can be applied by force or friction engagement to hold the product 2.

Figure 2:
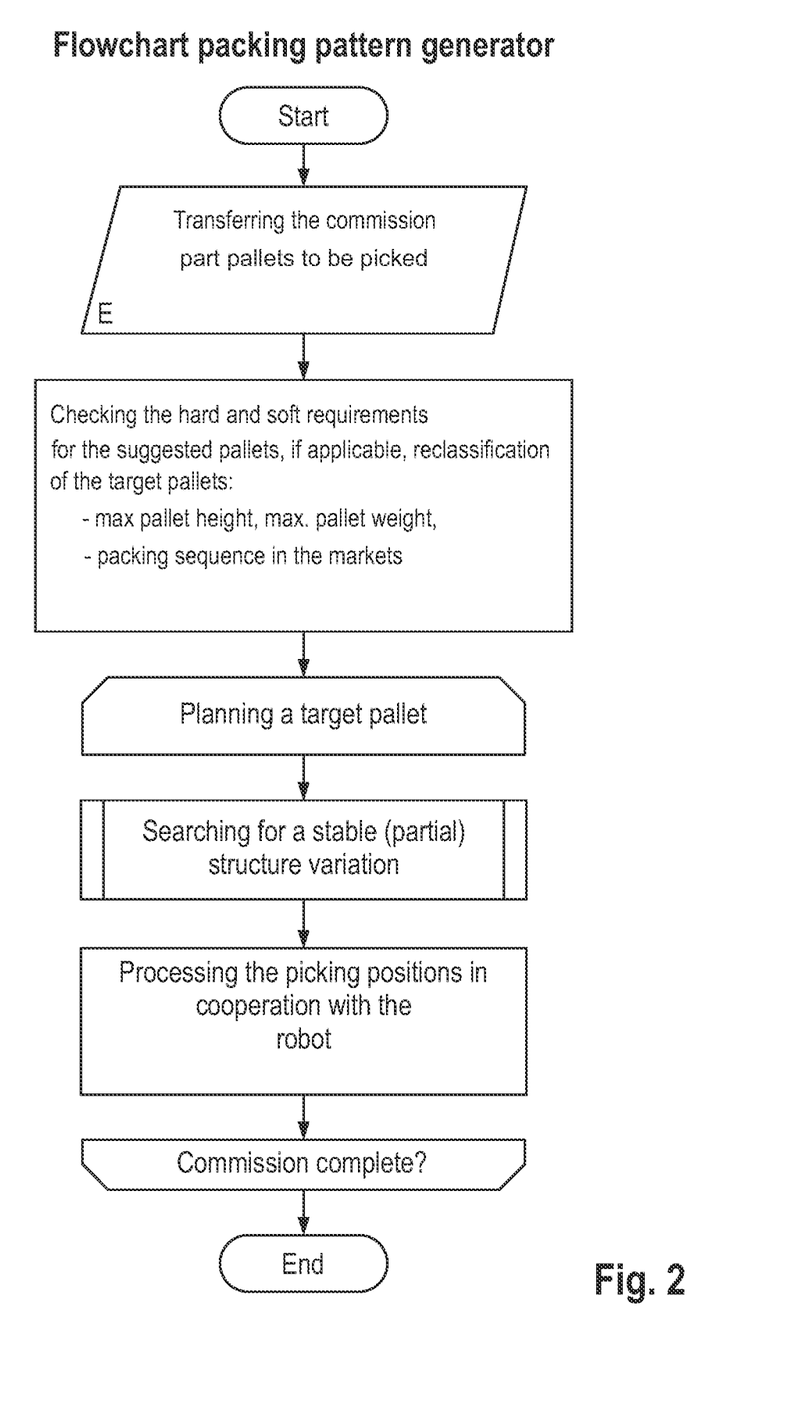
FIG. 2 shows a flowchart to illustrate how a packing pattern is generated by a packing pattern generator.

In the three-dimensional illustrations according to FIGS. 1 and 2 only two of the grabber plates are visible, for example, the grabber plates 20b, 20c of the grab head 16. The drives for adjusting the grabber plates 20 are not shown either.

For driving the loading system 1, a control unit 22 (with integrated packing pattern generator 32) is provided, in which a predetermined packing pattern is calculated according to the aforementioned planning algorithm for generating the picking commissions, according to which the products 2 are to be placed on the loading plate 12/target pallet 8. Depending on this packing pattern, the grab heads 16, 18 are then driven to pick up the products 2 in the predetermined sequence from the infeed conveyors 4a, 4b, 4c and 4d and to place them on the loading plate 12. The products 2, for example the fruit and vegetable crates, are stacked to form towers 24 (product stacks). This stacking takes place in layers in such a way that the product towers 24 "grow" in parallel, so to speak. However, it is possible that a higher product or several products are stacked at the same time in a product tower 24, so that the product stack height of the plurality of product stacks can vary to a certain extent.

The individual product stacks/towers on the loading plate 12 are initially spaced apart from each other to create space for the grabber plates 20 of the grab heads 16, 18 to move into the spaces between the product stacks. In this way, for example, one to eight, preferably four, product stack/towers can be placed on the loading plate 12. As mentioned, these towers 24 are spaced apart by a distance to each other to make room for the insertion of the grab head 16, 18.

As explained above, a stroke of the grab head 16, 18 can also be used to remove several products as intermediate stacks from the infeed conveyors 4 and to place them on the loading plate 12.

As already explained, it is possible to temporarily store smaller products/packages in a buffer station, to push them together and then to place them on the respective tower 24 using the grab head.

The loading system is furthermore equipped with a centering device 28. This centering device 28 has five sliding panels 30a, 30b, 30c, 30d and 30e, which are arranged according to FIG. 1 along the outer circumference of the loading plate 12 and—similar to the grabber plates 20—are slidable towards each other in order to move the product stacks/towers 24 on the loading plate 12 in such a way that the distances close and the towers 24 lie against each other. This means that the towers 24 are compacted and centered via the sliding panels 30 in such a way that the base surface occupied by the towers 24 is equal to or smaller than the base surface of the target pallet 8'. After this centering process, the sliding panels 30 remain in contact with the towers 24, so that they are fixed in position relative to each other. The loading plate 12 is then moved or moved apart along a guide in a horizontal, whereby the towers 24 remain stationary and can then be placed on the target pallet 8' by moving the sliding panels 30 apart and, if necessary, a small vertical stroke (Z direction).

The sliding panels 30a, 30b, 30c, 30d and 30e are adjustable independently from each other, so that the towers 24 placed on the loading plate 12 are pushed together to form the pallet nominal size including an overhang of 25 mm, for example, before they are transferred to the target pallet 8 or any other loading aid. The sliding panels 30 are, for example, moved by asynchronous drives and a rack mechanism. The sliding panels 30c, 30d, 30e are constructed as a unit, which are slidable by means of a common drive. The two sliding panels 30a, 30b shown in FIG. 1 in the back are pivotably mounted and driven so that they open the transport path in the shown position to discharge the completed commission pallet. This means that the sliding panel on the discharge side is configured in two parts and can be opened to allow the loaded target pallet 8" to be moved out. This pivoting is achieved, for example, by means of a joint arrangement and a rack mechanism. Accordingly, the centering device 28 shown has seven drive units (two pivoting drives, five linear drives) so that the towers 24 can be pushed together very quickly and with high precision.

The picked pallet 8" is then discharged via a discharge belt 34. The picked pallet 8" can be equipped with a suitable transport safety device, for example a belt or foil. This transport safety device can be attached within the picking unit 14 or in a subsequent station. In the illustration shown in FIG. 1, the loaded target pallet (picked pallet 8") is only shown in a partially loaded state. As explained above, the total height of the discharged pallet 8" can be about 2 m.

The planning algorithm specifies how the articles to be picked (packages) from given deliveries have to be geometrically positioned on pallets in order to obtain an optimal number of pallet storage spaces that meet various criteria with regard to volume utilization, stability, sequence, etc.

Furthermore, the picking commissions for the pallets have to take into account the possibilities of the stacking robot used. This robot essentially builds towers in the format ¼ Euro pallet, then compresses the goods to Euro format and places them on a Euro pallet.

For the planning algorithm, only deliveries with articles and the number of packages are known (only unit for each article). Charges/MHDs or predictive scheduling preferably do not play a role.

The interfaces of the planning algorithm are connected on the one hand to a WMS (wares management system), and on the other hand to the control of the packing robot. In addition, a graphical display represents the user interface.

The WMS also manages the destacking of full pallets of assortment items and distributes these quantities as seizable package towers in an area warehouse where they can be stored and retrieved using gantry grabbers.

The following data form the basis for all planning processes:

Stock List:

A stock list can be maintained manually in the picking system, hereinafter referred to as "pick sys", or kept up-to-date via an interface on the part of WMS.

Essential basic data are:
article No.
article description
article group
Measurable data (always related to 1 package):
length, width, height [mm]
weight [kg]
classification of base surface for evaluation of support points (4,9,16)
Criteria for stacking:
package type (1, 2, 3) (open with, open without web, closed)
package material (1, 2, 3) (cardboard, wood, plastic)
stacking capability (which package types can be stacked here)
engageability (packages put on top of each other interlock or not)

Article Classes

These are formed as combinations from the stacking criteria. To determine the surface, height and weight, for example, the following ranges are used:
Surface [$m^2$]: 0-0.12; 0.13-0.24
Height [m]: 0-0.16; 0.17-0.34
Weight [kg]: 0-8; 9-16; 17-25

This results in 18-19 main classes. The assignment of the articles to the classes enables the assessment of quality and performance.

Packing Requirements

Here, the different requirements that the planning algorithm should fulfill are managed:
requirement no.
description
current prioritization
individual evaluation for overall evaluation of a pallet New requirements should not be set up freely. They should always be incorporated into the algorithm (this is done by a program modification).

Deliveries

Deliveries are transmitted at any distance and to any extent. The actual processing is organized in time by the WMS by providing the following information on the packing positions.

Head information:
delivery no.
customer data (optional, only for display)
processing status
Positions:
position no.
article no.
quantity packages
processing status The planning algorithm then forms picking commissions, which are sent to the system for processing via the interface. A picking commission corresponds to a pallet storage space, which is linked to the following information.

Head information
picking commission no.
delivery no.
processing status
Positions:
picking position no.
position no.
article no.
quantity
geometric position on the finished pallet
geometric position during packing process (intermediate packing step, if necessary)
processing status The deliveries and the planned picking commissions undergo different statuses (processing status), which are used, for example, to make the following decisions in the process:

Deliveries:
1. delivery created in pick sys
2. picking planned
3. picking planning transmitted to WMS
4. packing process started (start first storage space)
5. processing completed Delivery positions:
1. created
2. planned
3. packed Picking commissions:
1. generated, created
2. packing started
3. packing cancelled (error)
4. packing continued manually (after error)
5. packing completed Picking positions:
1. created
2. quantity provided by WMS (belt known)
3. quantity placed at pre-position by robot (if applicable)
4. quantity placed at packing position The pick sys communicates with a WMS (Warehouse Management System) or an MFC (Material Flow Controller). These take over the storage and management of incoming deliveries, outgoing deliveries, and tours.

The WMS manages the destacking of full pallets of assortment items and manages these quantities as seizable package towers. The MFC coordinates the transport of the packages to the pick sys.

5 types of data are exchanged, which thus determines the rough course of the picking process:
1. data on deliveries (positions) to be converted into picking storage spaces
2. planned storage spaces with their components in the order in which they are to be provided.
3. notification of the provision of the picking parts directly afterwards: confirmation when the quantities are taken over by the robot
4. completion of the picking pallet
5. notifications about error situation, e.g. provided package does not meet expectations The used grab heads 16, 18 can grip packages of ¼-1/16 of the area of a Euro pallet (1200 mm×800 mm) (height virtually freely selectable from one package up to, for example, 70 cm). The base surface measures of the packages are: 600×400, 300×400, 300×200.

As explained at the beginning, the packages are placed on four infeed conveyors 4a, 4b, 4c, 4d, are gripped by the grab head 16, 18 and are placed on the loading plate 12 above the target pallet 2 in the form of four towers. The loading plate 12 is larger than the Euro storage space. The grabbers require gaps for gripping and releasing and can dive approx. 50 cm deep between the developing package towers.

After the content of the picking pallet has been assembled, the resulting 4 towers are pushed together to the Euro size and the sheet is pulled out so that the goods are placed on the pallet.

The smaller package measures (⅛ and 1/16) require an intermediate step in which the packages are placed on an extra sheet (buffer space) with additional intermediate gaps and are subsequently pushed together by the grabber itself to the ¼ measure. The resulting construct then fits into the ¼ tower structure and is placed on top of already existing towers.

The robot itself or its PLC control has no higher-level intelligence. This means that it receives simple transport orders "take a package stack of size L×W×H from belt B and place it at position xyz". The execution is then confirmed or an error situation is reported. Further orders are the use of an intermediate sheet and the pushing together of smaller packages on it, or the pushing together of the final pallet.

The central function is the planning algorithm for generating the picking commissions. Essential steps of this planning algorithm are shown in the flowchart in FIG. 2.

The basis for the calculation of the packing pattern is a series of requirements which have to be fulfilled with more or less priority. The requirements are provided with an evaluation, so that the planning result over all requirements results in an overall evaluation, which is to be maximized for each pallet but also on average for several pallets. This evaluation is also the basis for an evaluation of the system.

The division into hard and soft requirements is achieved by assigning priorities, whereby the highest priority stands for a requirement that must be fulfilled (hard).

The following requirements are known:
  Pallet height of 2 m, which must not be exceeded on the one hand, but should ideally be achieved on the other (high volume utilization)
  Maximum pallet weight of 1200 kg (Euro pallet; 600 kg for half-pallets)
  Maximum stability of the picking pallets (if possible "flat" upper end), no hollow spaces etc., take into account engageability of the packages)
  Heavy, large-size articles at the bottom of the pallet, light, small articles at the top
  For reasons of transport safety, the weight of the entire pallet must not be distributed asymmetrically in the pallet
  If possible, articles should not be distributed on several pallets (exceptions in case of impairment of stability or exceeding the maximum weight)
  Preferably, article groups should not be separated too much because of the depacking order in the stores, this is less important for the fruit and vegetable assortment at first
  Articles are positioned as compactly and closed as possible within the pallet, the stability of the pallet should be maintained as long as possible during packing. Where possible, towers that are too high should not be planned for an article
  If an article occupies an entire Euro layer in the pallet, the robot causes increased stacking effort (better: ½ Euro layer twice as high or also ¼ Euro 4 times as high)
  The load-bearing capacity of the articles by packages packed on it must be taken into account (stacking capability)
  Observance of the support points. The base surface of a package is viewed geometrically in 4, 9 or 16 rectangular sections. It is evaluated how many of the subareas are lying solidly on a package packed underneath These requirements are prioritized accordingly and applied accordingly in a new planning case.

Each generated picking commission receives a unique consecutive number and the assignment to the delivery. With this number the communication to the WMS is successful.

The resulting picking commissions should contain the individual article quantities to be stacked by the grab head (one article may be divided into two or more picking operations, if necessary) in order of stacking.

Figure 3:
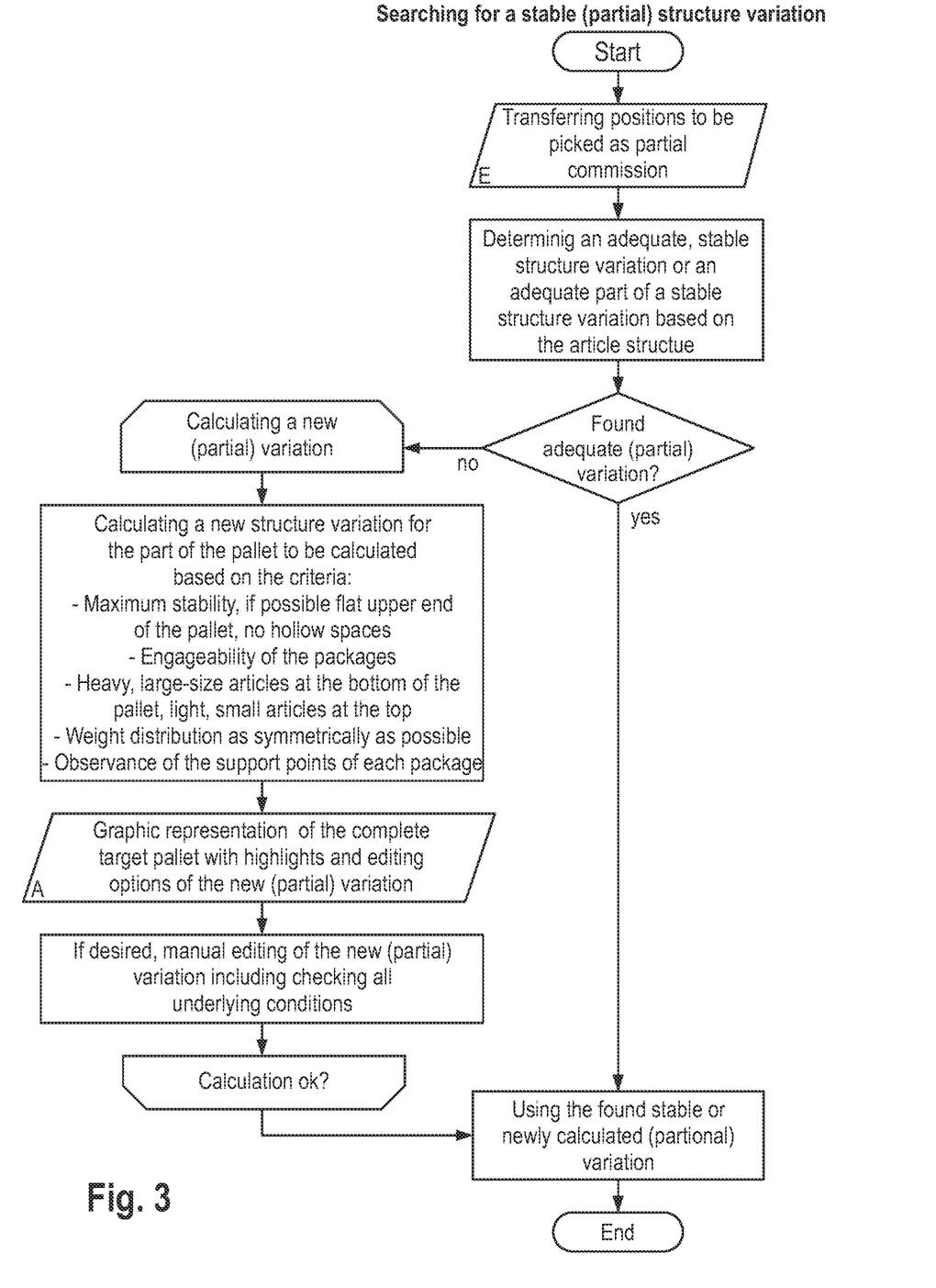
FIG. 3 shows a detailed illustration of a step according to the flowchart in FIG. 2, with which a stable structure variation is determined.

Each packing position has spatial coordinates:
  where is the position within the pallet
  where is the position to be placed at the time of packing This process results in a so-called structure variation, which can be evaluated by means of a suitable spatial graphic representation. Such a structure variation is usually automatically evaluated, as shown in the flow chart in FIG. 3, for example by a successful packing process without disturbances. Another possibility is the evaluation by an operator on a display.

A structure variation can, of course, be manually edited before the actual packing process (see FIG. 3), for example by dragging the colored packages on the display. When the mouse pointer is positioned, the respective article information is displayed. After each manual repositioning process, the respective package is locked by the system (grid function) and the stability criteria are checked and applied. Of course, the operator can also deactivate this automatic function so that a manual predefinition of a structure variation is also possible.

The aim of this system is to use structure variations that have been calculated and evaluated as stable again when recognizing the possibility in the article structure predefined by the WMS. In the case of the fruit and vegetable line of goods, this article structure is classified as highly repetitive and thus the reusability of a stable structure variation is classified as relatively high. Stable parts of a structure variation can also be used.

A new calculation is only performed if no available structure variation or parts thereof can be recognized and used. This leads to a step-by-step increase in loading stability.

During the packing process, the respective current state of the pallet is displayed graphically. If the packing process has to be cancelled, the operator can have the further steps displayed individually or directly view the finished target pallet so that the process can be completed manually if necessary.

Further elements of the user interface provide insight into the following data:
  transmitted deliveries (monitoring of processing status)
  created picking commissions (processing status, graphical representation)
  master data (articles, packing requirements)
  logging
  statistics (evaluation of planning results, runtimes of packing operations)

The internal interface to the PLC of the robot is handled by a function computer.

When the WMS registers the provision of a packing position, the robot is then commissioned with the packing process (see FIG. 2) (for the first position, provision of a pallet, basic equipment of the system). Upon acceptance notification from the belt by the robot, this is reported to the WMS or MFC so that the belt becomes available for the next preparation.

When the robot reports completion, the status of the packing position is updated and the next position to be processed is searched for and transferred to the robot. After the last packing position, the robot is given the order "push together and discharge".

The sequence (see FIGS. 2 and 3) in the overall system is therefore as follows:
1. The WMS sends one or more deliveries to the pick sys.
2. The pick sys calculates the required storage spaces for the delivery positions with all positions to be picked (including geometry data for the "packing location") and reports the required articles and quantities to the WMS with details of the sequence.
3. At any later point in time, the WMS begins to provide the packing positions for a storage space on provision belts (supplying the required partial quantities). The notification is sent to the pick sys with each provided partial quantity. The order of provision has to correspond to the order in the picking commission (which belt is used in each case is freely selectable). At least the next necessary picking position always has to be reachable. If a new picking commission is started, only positions of this commission may follow until it is finished.
4. The robot receives commissions for picking up the positions (provision belt, package size, target coordinates) and places them at the corresponding position in the picking field. (If necessary with intermediate step "small packages on extra sheet".)
5. After setting down the last picking position, a final notification is sent to the robot for pushing together and discharging. In addition, the final notification is sent to the WMS that the pallet can be transferred to storage.

According to the invention, error situations are processed as follows:

The most important known error would be the incorrect provision of a picking position by the WMS (package too small/too large, incorrect height). In this case, the picking process is cancelled, the started pallet is pushed together with the already built up positions and discharged. The remaining picking positions are manually cleared or diverted to a hand packing station. The picking commission has to be completed there manually.

Another error situation could occur if the WMS provides a position that does not belong to the current picking commission. In this case, the robot could clear the belt to a manual NIO position and acknowledge the provision negatively. Canceling the current job is therefore not necessary.

All the aforementioned parameters, conditions, data, boundary conditions, etc., which are taken into account in the processing of the picking commission and also the calculation/creation of structure variations, can be made the subject of a patent claim independently of each other.

Disclosed is a method for controlling picking of mixed products on a target pallet, wherein the products/packages are positioned on a loading plate or the like and then transferred to the target pallet.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

The invention claimed is:
1. A method for controlling picking of mixed products on a target pallet comprising:
generating a packing pattern by means of a packing pattern generator in dependence on a picking commission,
providing the products on infeed conveyors,
taking the products from the infeed conveyors by means of a grab head in a predetermined sequence according to the packing pattern,
placing the respective products in at least two product towers on a loading plate, wherein the towers are built approximately parallel to each other and are spaced from each other, wherein an area occupied by the towers on the loading plate is larger than a loading surface of a target pallet,
pushing the towers together to the dimensions of the target pallet,
transferring the pushed together product towers to the target pallet
creating a picking pallet;
discharging the picking pallet; and
wherein, when calculating the packing pattern, the support areas of the products in the respective product tower and any present stacking lugs/stacking recesses or other bottom/edge structures are taken into account.

2. The method according to claim 1, wherein, when the packing pattern is generated, the picking pallet is visualized on a display and/or the current structure of the picking pallet is visualized on the display during the picking process.

3. The method according to claim 1, wherein a picker can manually change the structure of the picking pallets and the manual input is stored and is included in the calculation of the packing pattern for similar picking commissions.

4. The method according to claim 1, wherein heavy products are arranged lying at the bottom during tower construction.

5. The method according to claim 1, wherein the picking pallet is provided with a transport safety device.

6. The method according to claim 1, wherein at least two grab heads are driven for the construction of the product towers.

7. The method according to claim 1, wherein during the assembly of the product towers, the respective product tower is centered with regard to a product/package to be placed thereon.

8. The method according to claim 1, wherein smaller products are placed on a buffer space and pushed together to dimensions corresponding to the dimensions of larger products and the pushed together packages are placed on the designated product tower.

9. The method according to claim 8, wherein four product towers are built on the loading plate and each smaller product has about half or a quarter of the area of the larger products so that respectively two or four packages per layer are placed on the buffer space.

10. The method according to claim 1, wherein at least one of the following requirements is included in the packing pattern:
maximum pallet height,
maximum pallet weight
product/packages are not distributed over several picking pallets,
product/package groups are combined on one picking pallet or in one product stack,
the same product/packages are combined in one tower.

11. The method according to claim 10, wherein the maximum pallet height is 2 m.

12. The method according to claim 10, wherein the maximum pallet weight is 1200 kg.

13. The method of claim 10, wherein maximum stability includes maintaining at least one of: a flat upper end of the picking pallet, no hollow spaces, engageability of the products/packages, and symmetrical weight distribution.

14. The according to claim 1, further comprising:
    calculating an alternative structure variation and automatically or manually selecting the alternative structure variation if required.

15. The method according to patent claim 14, with a prioritization of the structure variations.

* * * * *